(12) United States Patent
Chesley et al.

(10) Patent No.: US 7,809,798 B2
(45) Date of Patent: *Oct. 5, 2010

(54) SHARED OBJECT STORES FOR A NETWORKED COMPUTER SYSTEM

(75) Inventors: Harry R. Chesley, San Francisco, CA (US); Steven M. Drucker, Bellevue, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

This patent is subject to a terminal disclaimer.

(21) Appl. No.: 11/238,238

(22) Filed: Sep. 29, 2005

(65) Prior Publication Data

US 2006/0026264 A1 Feb. 2, 2006

Related U.S. Application Data

(63) Continuation of application No. 09/702,904, filed on Oct. 30, 2000, now Pat. No. 7,111,037.

(51) Int. Cl.
*G06F 15/16* (2006.01)
(52) U.S. Cl. .................. 709/213; 709/201; 709/203; 709/212; 709/216; 709/217
(58) Field of Classification Search ........... 709/219, 709/216, 201, 203, 212, 213, 217
See application file for complete search history.

(56) References Cited

U.S. PATENT DOCUMENTS

| | | | | |
|---|---|---|---|---|
| 5,499,343 A | * | 3/1996 | Pettus ..................... 709/203 |
| 5,764,902 A | * | 6/1998 | Rothrock .................. 709/205 |
| 5,822,585 A | * | 10/1998 | Noble et al. .............. 719/316 |
| 5,889,942 A | * | 3/1999 | Orenshteyn ............... 713/201 |
| 6,049,805 A | | 4/2000 | Drucker et al. ........... 707/102 |
| 6,166,732 A | * | 12/2000 | Mitchell et al. ........... 345/733 |
| 6,430,576 B1 | * | 8/2002 | Gates et al. ............... 707/201 |
| 6,438,743 B1 | * | 8/2002 | Boehm et al. ............. 717/122 |
| 6,611,844 B1 | * | 8/2003 | Saulpaugh et al. ........ 707/100 |
| 6,760,812 B1 | * | 7/2004 | Degenaro et al. ......... 711/133 |
| 2001/0010053 A1 | * | 7/2001 | Ben-Shachar et al. .... 709/105 |
| 2002/0055991 A1 | * | 5/2002 | Arrouye et al. ........... 709/220 |
| 2006/0031833 A1 | * | 2/2006 | Huang et al. .............. 717/178 |

* cited by examiner

*Primary Examiner*—Djenane M Bayard

(57) ABSTRACT

A store of interfaced software objects are distributed between a server computer and multiple client computers to support an object oriented application communication environment that provides communication between software applications on each client computer. The application communication environment may include a central shared object store of interfaced software objects that operate on a server computer and communicate with one or more software applications on the server computer. A local shared object store of interfaced software objects operates on each client computer and communicates with the central shared object store and one or more software applications on that client computer. Changes to interfaced software objects in the local shared object stores may be automatically propagated to the interfaced software objects in the central shared object store. A local private object store of interfaced software objects may operate on a client computer and communicate with one or more software applications on the client computer.

13 Claims, 6 Drawing Sheets

Fig. 2
Prior Art
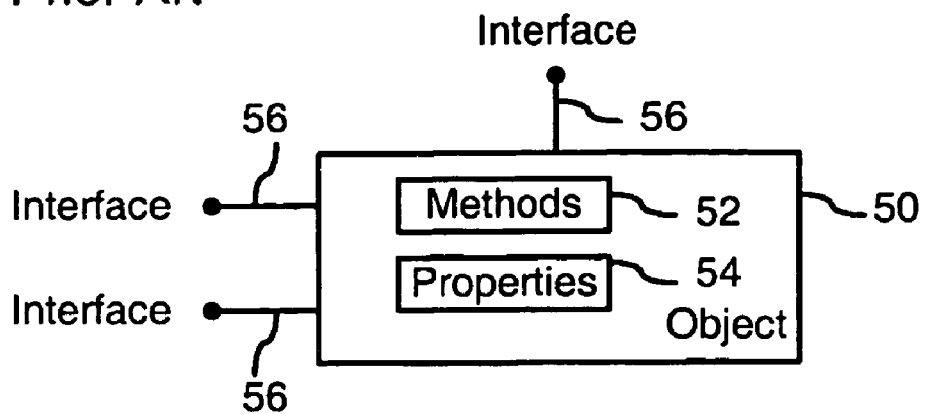
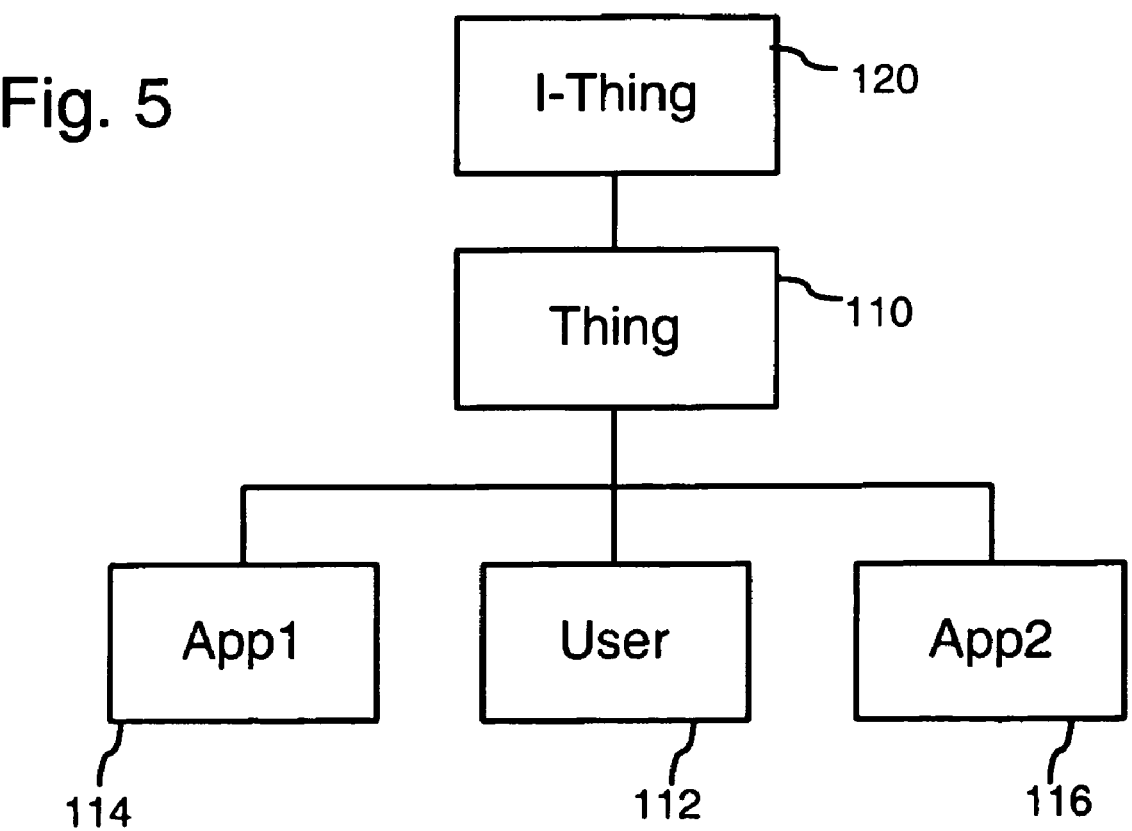
Fig. 5

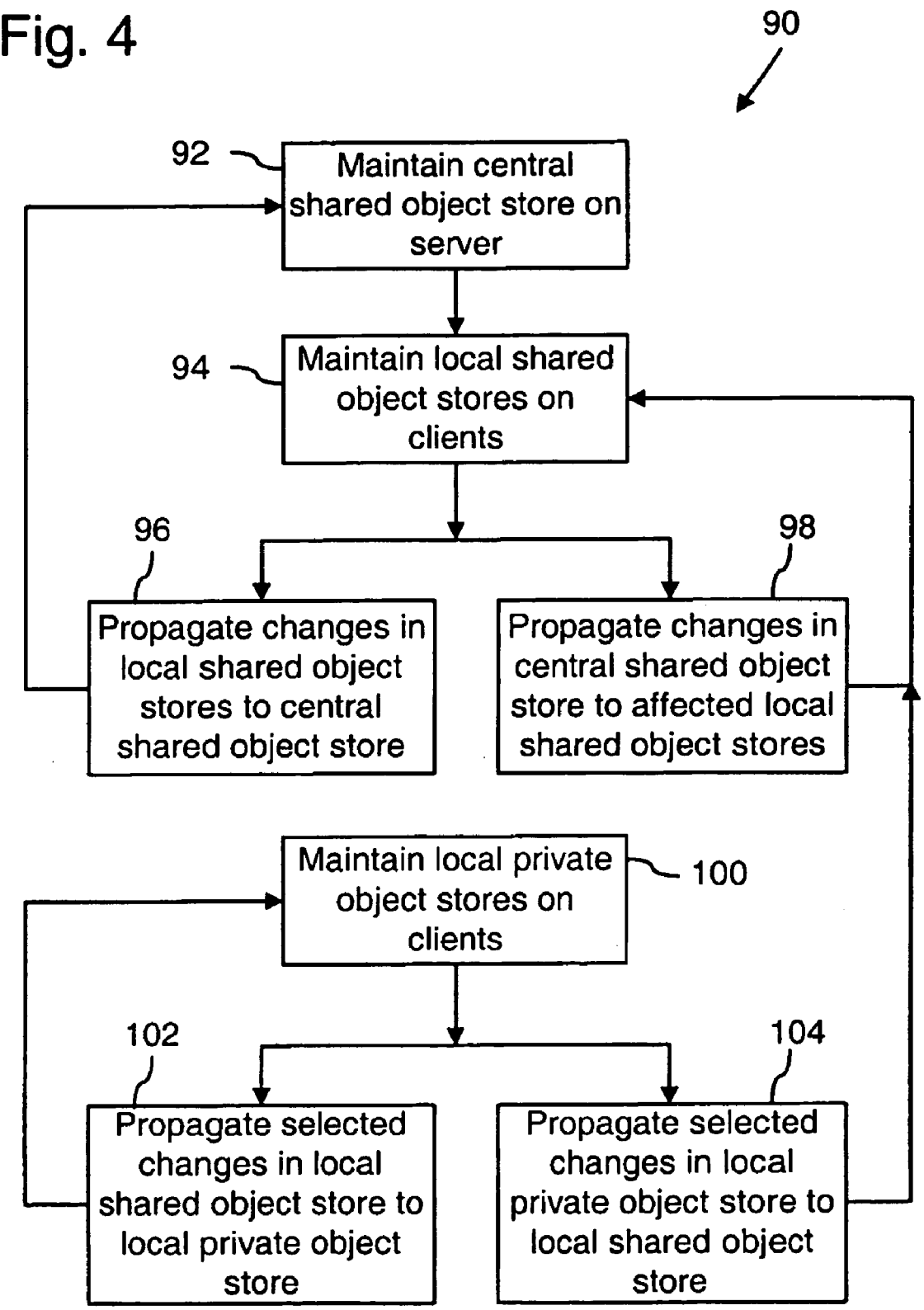

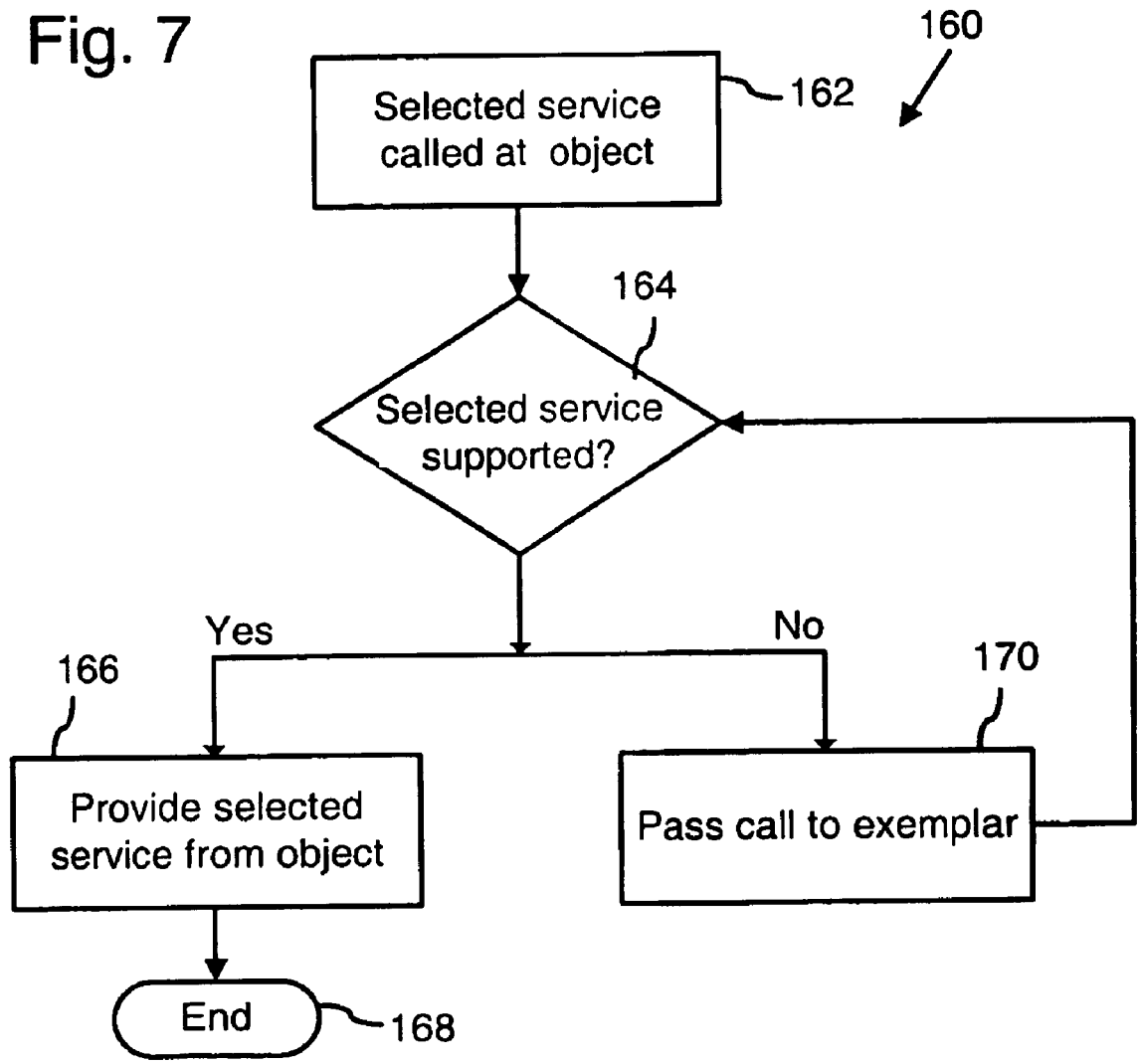

SHARED OBJECT STORES FOR A NETWORKED COMPUTER SYSTEM

CROSS REFERENCE TO RELATED APPLICATION(S)

This application claims priority to and is a continuation of U.S. patent application Ser. No. 09/702,904, filed Oct. 30, 2000, which is incorporated herein by reference.

FIELD OF THE INVENTION

The present invention relates to communication between software applications in a computer system and, in particular, to an application communication environment having shared and private object stores in a networked computer system.

BACKGROUND AND SUMMARY OF THE INVENTION

Multi-user worlds or domains, known as MUDs, are commonly used to provide a virtual world that represents a real or imaginary place. Computer graphics, images, video, force feedback, and audio data may be used to define a computer representation of the virtual world for one or more users. Typically, the virtual world enables multiple users to simultaneously perceive and interact with the virtual world and with each other through different computers that are connected by a network.

An object oriented MUD, referred to as a MOO, is a network database server that typically stores text objects having properties and methods. The topology of the space in a MOO is defined by room objects that represent discrete locations and are interconnected by portal objects. Objects in a MOO can also represent things located in a room, and objects called players or avatars represent the users' characters in the world. Users in the same room are able to talk by typing text and reading the text that others type. A graphical or multimedia MOO has been provided in accordance with a system described in U.S. Pat. No. 6,049,805 for Dynamic Event Mechanism for Objects with Associational Relationships, which is assigned to the assignee of the present invention. Typically, prior computer network object oriented domains were directed to one particular application, such as a virtual world game or a multi-user communication system.

The present invention includes a store of objects that are distributed between a server computer and multiple client computers to support an object oriented application communication environment that provides communication between multiple software applications or applets. In one implementation, the distributed object stores are an adaptation of an object oriented multi-user virtual world environment. The application communication environment provides a whiteboard for information sharing among multiple pieces of code (applets). (The term "whiteboard" is used here in a computer science sense of a shared information repository, not in the human sense of a graphic display device.)

The application communication environment may include a central shared object store of interfaced software objects that operate on a server computer and communicate with one or more software applications on the server computer. A local shared object store of interfaced software objects operates on each client computer and communicates with the central shared object store and one or more software applications on that client computer. Changes to interfaced software objects in the local shared object stores are automatically and dynamically propagated to the interfaced software objects in the central shared object store. As a result, communications between the one or more software applications and the local shared object store on each client computer are available to the central shared object store.

In one implementation, the application communication environment may also include a local private object store of interfaced software objects that operate on each client computer and communicate with one or more software applications on the client computer. The local private object store is separate from the local shared object store. Communications between the one or more software applications and the local private object stores on each client computer are not directly available to the central shared object store.

The present invention provides an extensible application communication environment that reduces server computational and data transmission resource demands by only providing updates of a changed object to the appropriate client computers. In addition, local private object stores can provide a local application communication environment that requires no network resources and is secure with respect to the computer network.

Additional objects and advantages of the present invention will be apparent from the detailed description of the preferred embodiment thereof, which proceeds with reference to the accompanying drawings.

BRIEF DESCRIPTION OF THE DRAWINGS

FIG. 2 is a block diagram of a prior art interfaced software object.

FIG. 4 is a flow diagram of an application communication method for providing communication between multiple software applications in a networked computer system.

FIG. 5 is a block diagram representing hierarchical inheritance relationships between an exemplary set of objects.

FIG. 7 is a flow diagram illustrating a hierarchical inheritance process.

DETAILED DESCRIPTION OF PREFERRED EMBODIMENTS

Figure 1:
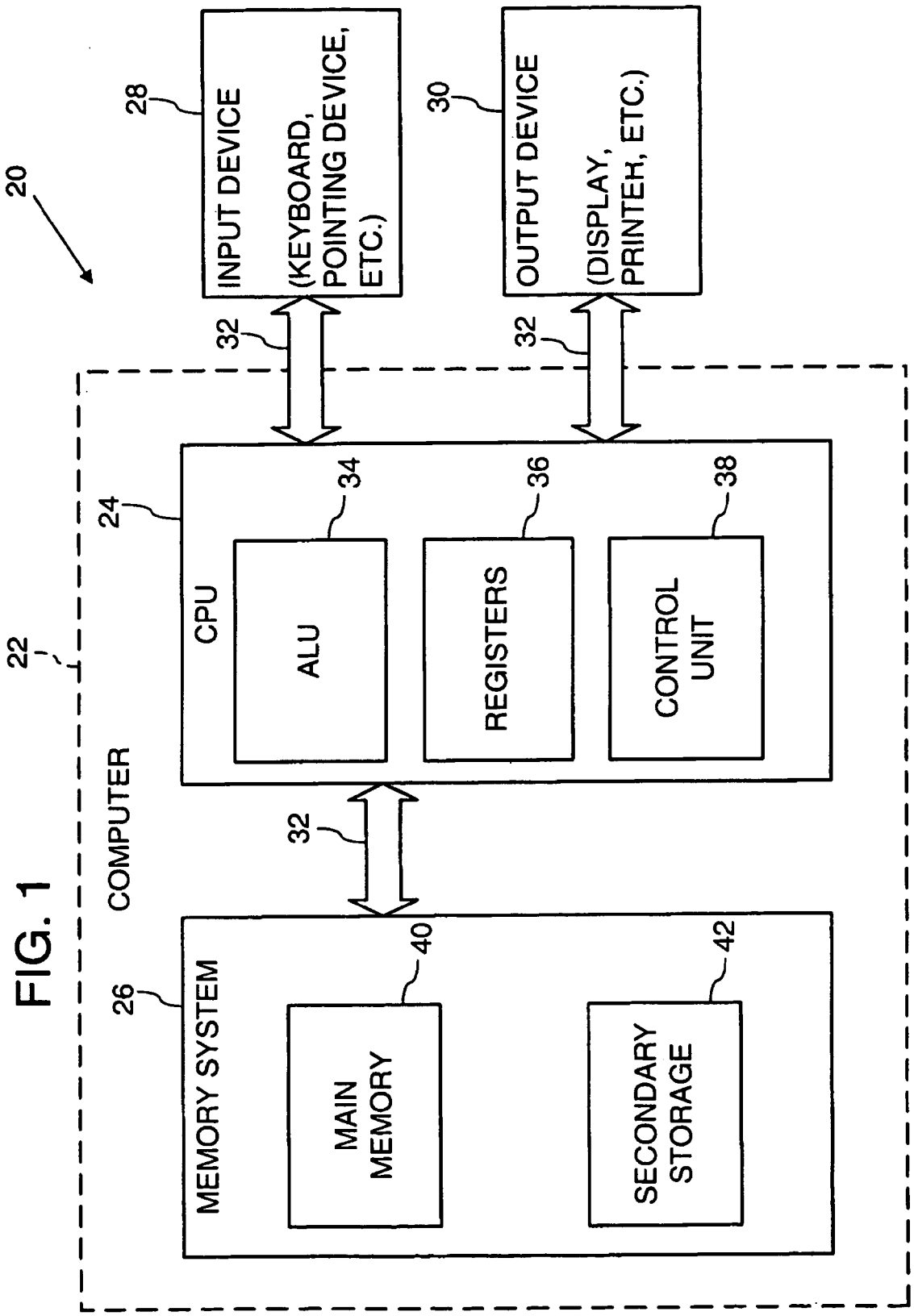
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by a software program or may be an entirely separate executable process.

Each object 50 is an instance of a specific class of related objects. Exemplary object 50 also includes the characteristics of encapsulation, polymorphism, and inheritance. Object 50 encapsulates its properties 54 so each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

Object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3:
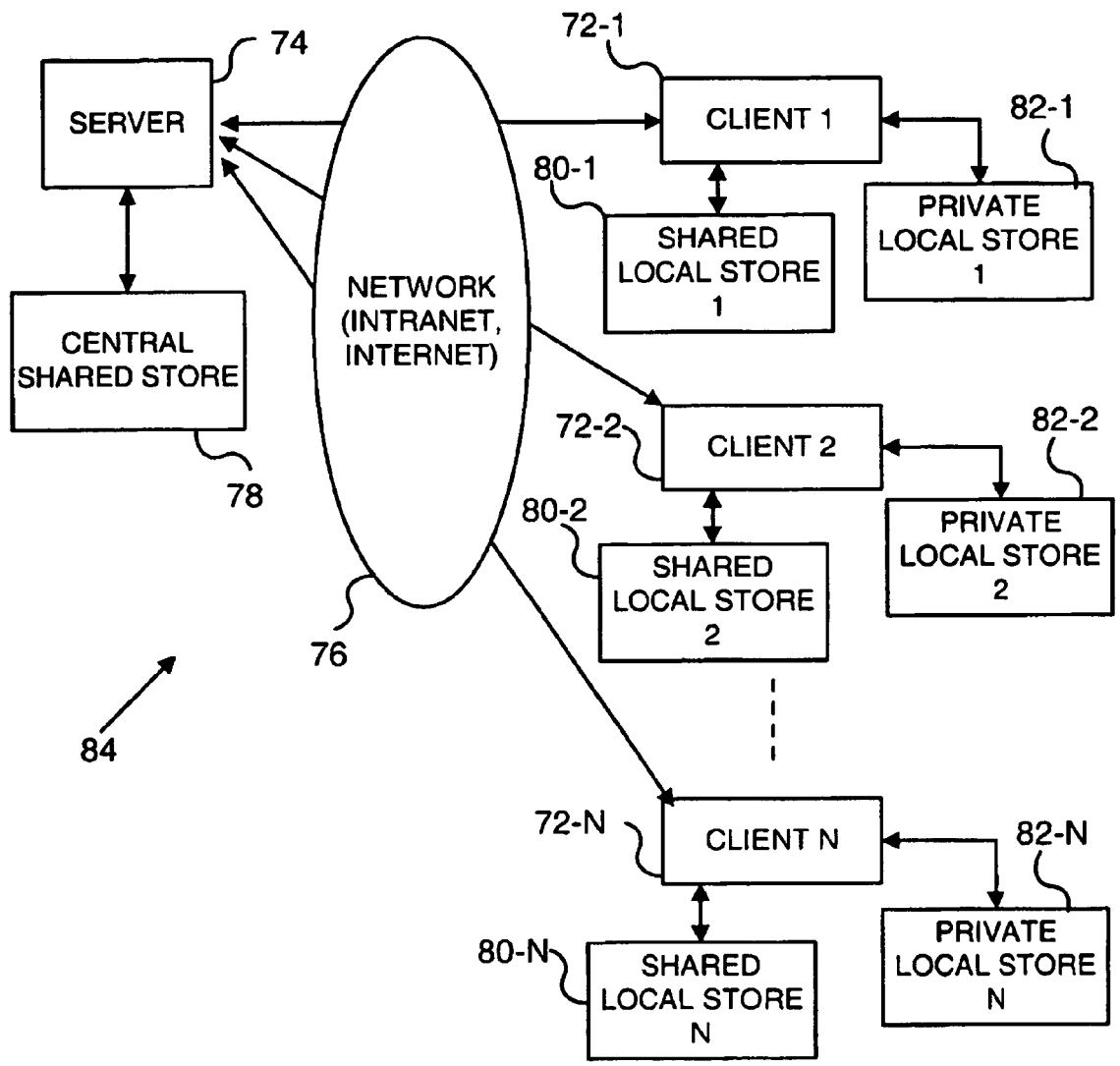
FIG. 3 is an exemplary view of a client-server network architecture with an application communication environment having a shared object store maintained by the server computer and local object stores maintained by each of n-number of client computers.

FIG. 3 is a block diagram illustrating a client-server architecture as an exemplary operating environment for a distributed object store 84 according to the present invention. Multiple client computers or clients 72 are in communication with a server computer or server 74 via a network 76, such as a LAN, WAN, intranet, or the Internet. Clients 72 and server 74 have, for example, the basic configuration illustrated in FIG. 1, but may include component variations as is known in the art. Server 74 maintains a central shared object store 78 while clients 72 maintain local shared object stores 80 and local private object stores 82. Central shared object store 78, local shared object stores 80, and local private object stores 82 together form distributed object store 84.

Distributed object store 84 provides an application communication environment through which local and distributed (i.e., networked) software applications or applets with shared characteristics communicate with each other, while private local software applications may communicate securely apart from the shared applications typically without direct user interaction. As described below in greater detail, central shared object store 78 and local shared object stores 80 provide application communications between software applications operating on server 74 and clients 72, which communications are generally available to all local shared object stores 80 on clients 72. The applications or applets (referred to as applications hereafter) may exist as methods on objects within the same object store and may be invoked by events that are fired when information changes. Multiple applications can coexist in the same object store without prior knowledge of each other.

The shared aspect of the application communication environment is sometimes referred to as a "whiteboard" for information sharing among multiple pieces of code or applications. (The term "whiteboard" is used here in a computer science sense of a shared information repository, not in the human sense of a graphic display device.) In one implementation, the application communication environment may represent an adaptation of an object oriented multi-user domain virtual world environment, an example of which is described in U.S. patent application Ser. No. 09/088,246, filed Jun. 1, 1998, and assigned to the assignee of the present invention.

Local private object stores 82 have analogous, or even the same, structure and operation as shared object stores 78 and 80, but local private object stores 82 are securely distinct from shared object stores 78 and 80. Local private object stores 82 provide application communications between software applications that are local to a client 72, which communications are unavailable to other client computers 72. Distributed object store 84 with shared object stores 78 and 80 and private object stores 82 provides an application communication environment that is adaptable and extensible while maintaining a secure separation between local and shared resources.

In operation, central shared object store 84 maintains a complete and centralized representation of shared elements of the application communication environment and includes all shared objects disposed therein. A first client 72-1 maintains a first local shared object store 80-1 and a first local private object store 82-1. Local shared object store 80-1 includes a subset of the information contained in central shared object store 78 and need only contain those objects that may potentially affect objects or applications associated with first client 72-1. A second client 72-2 maintains a second local shared object store 80-2 and a second local private object store 82-2. Local shared object store 80-2 contains information about objects that may potentially affect objects or applications associated with client 72-2, and thus may be different in its information content than first local shared object store 80-1. Moreover, server 74 is shown coupled to an N-th client 72-N having an N-th local shared store 80-N, to indicate that an indeterminate number of clients can be coupled to server 74 for interaction in the application communication environment.

Portions of central shared object store 78 maintained on server computer 74 are downloaded to each of multiple individual client computers 72 and are included in each of multiple corresponding local shared object stores 80. Objects in local shared object stores 80 are available for communication with one or more software applications operating on clients 72, typically without requiring interaction by the client user or operator. Manipulation of or changes to objects in local shared object stores 80 are communicated to central shared object store 78 maintained on server computer 74. Updates to central shared object store 78 due to changes at clients 72 are handled automatically and dynamically by server computer 74.

The local shared object store 80 maintained at each client computer 72 corresponds to the portion of the application communication environment that relates to shared information that has been requested or is to be referenced by a software application operating on the client 72. The remainder of the central shared object store 78, which corresponds to the remaining portion of the application communication environment that has not been requested or is not to be referenced by a software application on the client 72, is of no consequence to that client 72 and is not maintained in the local shared object store 80 on that user's client computer 72. Accordingly, changes to the application communication environment represented by central shared object store 78 are provided to local shared object stores 80 of clients 72 with software applications that may potentially utilize the changes. The local shared object stores 80 of clients 72 with software applications that will not currently or are unlikely to utilize the changes are not updated with changes to the application communication environment represented by central shared object store 78.

It will be appreciated that there are a wide variety of software applications capable of utilizing the shared object stores 78 and 80 of the illustrated application communication environment. Examples of information that may be shared among users and between clients 72 in such an environment may include an indication of whether a user is at (e.g., logged into) a client 72, an indication of whether a user is busy at a client 72 (e.g., according to the presence or absence of keystroke activity), a user's calendar indicating possible future availability, instant online communication or messaging between users, including an indication of whether a user is available for instant communication (e.g., as represented in a "buddy list"), online video conferencing between users, indications of postings (e.g., goals) for selected groups, etc.

Objects in a local private object store 82 of a client 72 are available for communication with one or more software applications operating on the client 72, typically without requiring interaction by the client user or operator. Manipulation of or changes to objects in local private object stores 82 are typically utilized by software applications on the client 72, but in some instances may be communicated to local shared object store 80 for use as shared information. The local private object store 82 maintained at each client computer 72 corresponds to the portion of the application communication environment that relates to private information that typically is maintained only on the corresponding client 72 and has been requested or is to be referenced by a software application operating on that client 72.

It will be appreciated that there are a wide variety of software applications capable of utilizing the private object stores 82 of the illustrated application communication environment. Examples of information that would typically be used only at a particular client 72 in such an environment may include an indication of which software applications are currently running on the client 72, a user's personal calendar, an indication of graphical input device (e.g., mouse) or keyboard actions, user identity information following login, prior history activity to discern patterns and provide shortcut suggestions, a natural language processor, a command interpreter that is made available to other processes for interpreting various commands, etc.

Server 74 can actually comprise a network of distributed servers to scale resource capacity as necessary to efficiently administer the shared object store. The use of distributed servers to administer the shared object store would thereby provide dynamic scaling of resources to match the number of users participating in the application communication environment. Also, another feature of the claimed invention is that server 74 can anticipate the need for an update to a particular local shared object store 80, so that synchronous "handshakes," which would require frequent bi-directional exchanges between the clients and the server, are dramatically reduced, and computational and data transmission resources of the server and client, and of the network may be more efficiently employed. However, not all data need be marshalled.

The present invention provides an extensible application communication environment. Server computer 74 administers central shared object store 78, which contains the properties for each shared object. Further, when a change occurs to a shared object in the application communication environment, server computer 74 updates the application communication environment representation on client computers 72 for the users that are affected by the change. As a result, the present invention reduces server computational and data transmission resource demands by only providing updates of a changed object to clients 72 associated with objects that include the changed object. In addition, local private object stores can provide a local application communication environment that requires no network resources and is secure with respect to the computer network.

FIG. 4 is a flow diagram of an application communication method 90 for providing communication between multiple software applications in a networked computer system having a server computer and multiple client computers.

Process block 92 indicates that a central shared object store of interfaced software objects is maintained on a server computer for communicating with multiple software applications on the server computer.

Process block 94 indicates that a local shared object store of interfaced software objects is maintained on each client computer for communicating with the central shared object store and one or more software applications on the client computer.

Process block 96 indicates that changes to interfaced software objects in each shared local object store are propagated (e.g., automatically and dynamically) to the interfaced software objects in the central shared object store. As a result, communications between the software applications and the local shared object store on each client computer are made available to the central shared object store, which thereby maintains a complete and centralized representation of the interfaced software objects of the local shared object stores.

Process block 98 indicates that changes to interfaced software objects in the central shared object store are propagated (e.g., automatically and dynamically) to the interfaced software objects in the one or more affected shared local object stores.

Process block 100 indicates that a local private object store of interfaced software objects is maintained on each client computer for communicating with one or more software applications on the client computer. In one implementation, communications between software applications and the local private object store on each client computer are not directly available to the central shared object store.

Process block 102 indicates that changes to one or more selected interfaced software objects in a local shared object store of a client computer are propagated (e.g., automatically and dynamically) to the interfaced software objects in the local private object store of the client computer.

Process block 104 indicates that changes to one or more selected interfaced software objects in a local private object store of a client computer are propagated (e.g., automatically and dynamically) to the interfaced software objects in the local shared object store of the client computer. The selected interfaced software objects may represent a filtered view of local private information on the client computer. For example, local private information may indicate which applications are currently running on a client computer or which particular keystrokes are being typed. The corresponding filtered information to be shared could indicate that one or more unspecified applications are running or that unspecified keystrokes are being made, thereby resulting in shared information indicating the current state of a user while maintaining his or her privacy. The operation of process blocks 102 and 104 provides selective communication between the private and shared object stores while maintaining the security of the private object store and its independence from network resources (e.g., bandwidth).

In one implementation, interfaced software objects are persistent and object services like methods or properties may be provided to or inherited by objects dynamically during run-time. This dynamic inheritance may be provided within the context of an object model, such as the Component Object Model, that supports only design-time inheritance. As applied in an application communication environment, for example, dynamic inheritance can provide increased and adaptable levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced object whenever the service is available therefrom or the call is passed to yet another referenced object until the service can be provided. The call may be passed to multiple successive referenced objects until the call reaches the root object, which either provides the service or the service is deemed unavailable.

Further in accordance with an implementation of the present invention, a dynamic or latebound event mechanism provides an event mechanism operation among objects. In addition, objects may be responsive to event notification methods that are not initially within the original object definition, thereby allowing the event notification methods to be inherited by objects dynamically during run-time. This latebound event mechanism and dynamic inheritance may be provided within the context of an object model, such as the component object model, that supports only design-time interface inheritance. As applied in an application communication environment, for example, latebound event mechanism and dynamic inheritance can provide increased levels of interaction and control.

FIG. 5 is a block diagram illustrating hierarchical inheritance relationships between an exemplary set of objects 110-116 that include data and operations associated with the data. Objects 110-116 have hierarchical inheritance relationships between them that may be used to extend the latebound event mechanism. Objects 110-116 are based upon an interface 120 (designated I-Thing) that in one implementation is a COM object interface. It will be appreciated, however, that I-Thing interface 120 could alternatively be implemented according to other object models.

Objects 110-116 are the basic objects or types from which other objects inherit services and are called the exemplars for the application communication environment. Object 110 (designated Thing) is the root or core of the set of all interfaces in the representation. Object 112 (designated User) may correspond to a user of a client computer. Objects 114 and 116 (designated App1 and App2) represent and define selected exemplary applications or application features that utilize the application communication environment.

Figure 6:
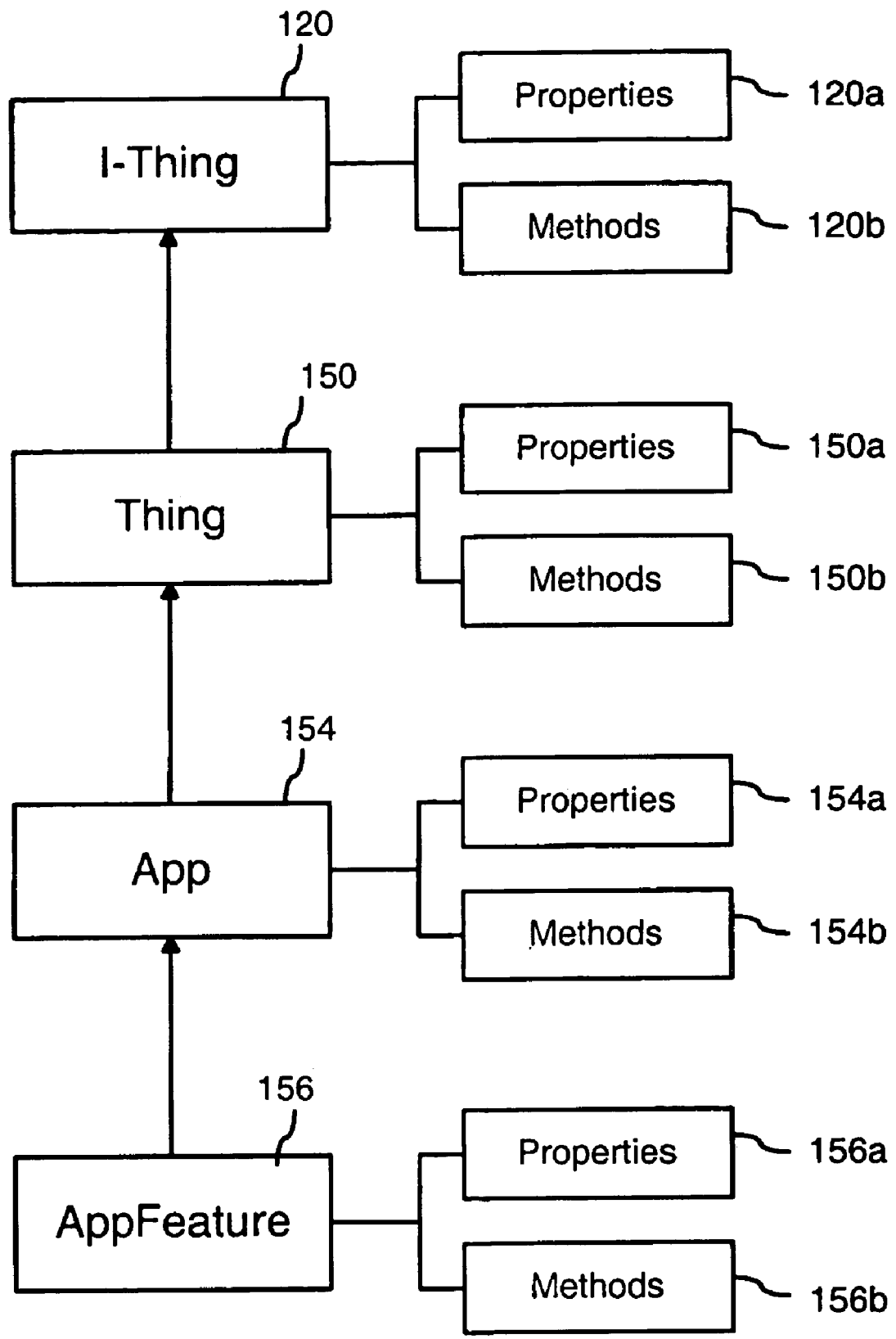
FIG. 6 is a block diagram illustrating a sequence of hierarchical inheritance relationships.

FIG. 6 is block diagram illustrating a sequence of hierarchical inheritance relationships between Thing object 150, exemplar App object 154, and an AppFeature object 156. App object 154 corresponds to an application that utilizes the application communication environment, and AppFeature object 156 corresponds, for example, to an instance of information that is utilized by an application. Objects 150, 154, and 156 include the characteristics described with reference to object 50 (FIG. 2) which characteristics are represented as properties 150*a*, 154*a*, and 156*a* and methods 150*b*, 154*b*, and 156*b*, respectively. Thing object 150 is the root or parent exemplar of the set of objects and is the direct exemplar to App object 152. App object 152 is the direct exemplar to AppFeature object 156.

Thing object 150 defines properties 150*a* and methods 150*b* shared by all other objects in the representation or virtual world environment, including objects 154 and 156.

Properties 150*a* include for a particular object an exemplar property that refers to the exemplar or parent of the particular object, a name property that lists the name of the particular object, and a description property that includes a text description of the particular object.

Properties and methods are associated with object interfaces during a design time phase when a developer creates them. The interfaces of objects defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

FIG. 7 is a flow diagram illustrating a dynamic inheritance process 160 as a run-time use of objects. For purposes of illustration, dynamic inheritance process 160 is described with reference to the sequence of hierarchical inheritance, relationships shown in FIG. 5.

Process block 162 indicates that a reference or call is made to a selected service (e.g., a property or a method) at a selected object (e.g., object 156), thereby making the selected object the current object. The reference or call may be made in the conventional manner that properties and methods of an object are referred to or called.

Query block 164 represents a query as to whether the current object receiving the reference or call (e.g., object 156) supports the selected property or method. Whenever the current object (e.g., object 156) supports the selected property or method, query block proceeds to process block 166. Otherwise, query block 164 proceeds to process block 170.

Process block 166 indicates that the selected property or method is provided by the current object. Process block 166 proceeds to termination block 168.

Process block 170 indicates that the reference or call to the selected property or method is passed to the direct exemplar of the current object (e.g., object 154) and the direct exemplar is redesignated the current object. Process block 170 returns to query block 164.

Process 160 provides a mechanism for dispatching properties and methods to exemplars. Process 160 supports dynamic inheritance of other properties and methods at run-time by allowing intervening exemplars to be added to a hierarchy of objects.

With reference to FIG. 5, in one implementation I-Thing interface 120 also defines, supports, or implements methods 120*b* that include the dynamic inheritance methods set forth in Table 1. Methods 120*b* in Table 1 are available to each object of which I-Thing interface 120 is the root exemplar (e.g., objects 110-116 and 156).

TABLE 1

| Name | Action |
| --- | --- |
| AddMethod | Adds a designated method to make the method available to the object |
| RemoveMethod | Removes a designated method to make the method unavailable to the object |
| AddProperty | Adds a designated property to make the property available from the object |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method |

TABLE 1-continued

| Name | Action |
| --- | --- |
| PutProperty | Puts a designated value or designated values in the parameters of a designated property |
| InvokeMethod | Invokes a designated method |

For example, methods and properties available for implementation or access by the dynamic inheritance methods of I-Thing interface 120 are in a dynamic inheritance listing, such as a table, that indicates the names of the methods and properties, defines the services they provide, and includes unique identifiers for them. The unique identifiers may be of the form of integer values like the dispatch identifiers (DISPIDs) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method. The GetMethod and the GetProperty methods return the designated method and property, respectively, from the dynamic inheritance listing. The PutMethod and the PutProperty methods allow a user to set the method or property.

The dynamic inheritance methods of Table 1, as well as the dynamic inheritance process 160 of FIG. 7, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular interface or object according to dynamic inheritance process 160. In addition, methods and properties may be added by adding them to the set of methods and properties available at an exemplar, such as the root exemplar I-Thing.

These features allow inheritance to be dynamic and provide a seamless scripting environment in programmable applications like virtual world environments. Moreover, the dynamic inheritance methods of Table 1 and dynamic inheritance process 160 of FIG. 7 may be used together as described hereinabove, or either may be used alone to provide dynamic inheritance functionality.

The dynamic inheritance method InvokeMethod is similar to the Invoke method of the IDispatch interface used in COM automation. The IDispatch::Invoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 120 after it has been established is a major improvement upon the prior functionality of objects with fixed interfaces (e.g., COM objects) like the IDispatch interface.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. In a networked computer system having a server computer in communication with plural client computers, an application communication environment with object stores, comprising:
    a central shared object store of interfaced software objects that operate on the server computer and communicate with plural server software applications on the server computer;
    a local shared object store of interfaced software objects that operate on each client computer and communicate with the central shared object store and a first plurality of client software applications on the client computer, communications between the first client software applications and the local shared object store on each client being available to the central shared object store, at least one of the interfaced software objects of at least one client computer dynamically inheriting one or more object services during runtime; and
    a local private object store of interfaced software objects that operate on each client computer and facilitates communication between second client software applications on the client computer, communications between the second client software applications and the local private object store on each client computer not being directly available to the central shared object store, wherein a representation of one or more modified interfaced software objects of the local private object store are communicated to the local shared object store while maintaining a security of the local private object store.

2. The system of claim 1 in which the interfaced software objects of each local shared object store are instances of the interfaced software objects of the central shared object store.

3. The system of claim 1 in which the central shared object store maintains a complete and centralized representation of the interfaced software objects of the local shared object stores.

4. The system of claim 1 in which changes to interfaced software objects in the local shared object stores are automatically and dynamically propagated to the interfaced software objects in the central shared object store.

5. The system of claim 1 in which the interfaced software objects in the central shared object store and the local shared object store provide communication between users of the client computers.

6. In a networked computer system having a server computer in communication with plural client computers, an application communication method, comprising:
    maintaining on the server computer a central shared object store of interfaced software objects that communicate with plural server software applications on the server computer;
    maintaining on each client computer a local shared object store of interfaced software objects that communicate with the central shared object store and a plurality of first client software applications on the client computer, communications between the first client software applications and the local shared object store on each client being available to the central shared object store, at least one of the interfaced software objects of at least one client computer dynamically inheriting one or more object services during runtime;
    maintaining on each client computer a local private object store of interfaced software objects that facilitates secure communication between second client software applications on the client computer, communications between second client software applications and the local private object store on each client computer not being available to the central shared object store; and
    modifying at least one interfaced software object of the local private object store, communicating a representation of the at least one modified interfaced software object to the local shared object store; and maintaining a security of the local private object store.

7. The method of claim 6 further comprising maintaining in the central shared object store a complete and centralized representation of the interfaced software objects of the local shared object stores.

8. The method of claim 6 further comprising automatically and dynamically propagating to the interfaced software objects in the central shared object store changes to interfaced software objects in the local shared object stores.

9. The method of claim 6 in which the interfaced software objects in the central shared object store and the local shared object store provide communication between users of the client computers.

10. A method comprising;
    a) providing a networked computer system having a server computer in communication with a first client computer and a second client computer;
    b) providing on the server computer a central shared object store of a plurality of central interfaced software objects for communicating with one or more server applications on the server computer;
    c) providing on the first client computer a first local shared object store storing a plurality of first local interfaced software objects for communicating with one or more first client software applications on the first client computer, the plurality of first local interfaced software objects corresponding to at least a first portion of the plurality of central interfaced software objects;
    d) providing on the second client computer a second local shared object store storing a plurality of second local interfaced software objects for communication with one or more second client software applications on the second client computer, the plurality of second local interfaced software objects corresponding to at least a second portion of the plurality of central interfaced software objects;

e) modifying at least one interfaced software object of the plurality of first local interfaced software objects;

f) automatically modifying a corresponding interfaced software object of the central shared object store based on the modified at least one interfaced software object of the plurality of first local interfaced software objects;

g) determining if the second client computer is likely to utilize the modified at least one interfaced software object;

h) in response to the determination, automatically modifying a corresponding interfaced software object of the second local shared object store based on the modified at least one interfaced software object of the central shared object store;

i) dynamically inheriting one or more object services by at least one of the plurality of first local interfaced software objects during runtime;

j) providing at the first client computer a local private object store storing at least one third local interfaced software object for securely communicating between third client software applications on the first client computer, the at least one third local interfaced software object not being available to the second client computer and the at least one third local interfaced software object being available for communicating between third client software applications on the first client computer; and k) communicating a secure representation of the at least one third local interfaced software object to the central shared object store, the secure representation maintaining security of the local private object store.

11. The method of claim 10 further comprising preventing modifying a corresponding interfaced software object of the second local shared object store based on the modified at least one interfaced software object of the central shared object store if the second client computer is determined to be unlikely to utilize the modified at least one interfaced software object.

12. The method of claim 10 wherein the networked computer system includes a plurality of server computers, each server computer providing at least a portion of the central shared object store.

13. The method of claim 10 further comprising providing one or more object services to at least one of the plurality of first local interfaced software objects during runtime.

* * * * *